United States Patent

Hirase

[11] Patent Number: 6,031,837
[45] Date of Patent: Feb. 29, 2000

[54] METHOD FOR FORMING MULTIPLE BIDIRECTIONAL CONNECTIONS FOR USE IN ASYNCHRONOUS TRANSFER MODE SWITCHING DEVICE

[75] Inventor: Fumio Hirase, Kawasaki, Japan

[73] Assignee: Fujitsu Limited, Kanagawa, Japan

[21] Appl. No.: 08/851,007

[22] Filed: May 5, 1997

[30] Foreign Application Priority Data

Oct. 17, 1996 [JP] Japan ................................. 8-274756

[51] Int. Cl.[7] .................................................. H04L 12/18
[52] U.S. Cl. ........................... 370/395; 370/400; 370/449
[58] Field of Search ................................... 370/395, 396, 370/398, 400, 443, 447, 449, 461, 462, 399, 386, 397

[56] References Cited

U.S. PATENT DOCUMENTS

| | | | |
|---|---|---|---|
| 5,386,417 | 1/1995 | Daugherty et al. | 370/386 |
| 5,400,339 | 3/1995 | Sekine et al. | 370/399 |
| 5,487,063 | 1/1996 | Kakuma et al. | 370/396 |
| 5,509,010 | 4/1996 | La Porta et al. | 370/397 |

FOREIGN PATENT DOCUMENTS

| | | |
|---|---|---|
| 4-192838 | 7/1992 | Japan . |
| 4-286457 | 10/1992 | Japan . |
| 5-95364 | 4/1993 | Japan . |
| 7-284079 | 10/1995 | Japan . |

*Primary Examiner*—Dang Ton
*Assistant Examiner*—Tuan Q Ho
*Attorney, Agent, or Firm*—Helfgott & Karas, P.C.

[57] ABSTRACT

A method for establishing bidirectional connections and multiple connections performed by an ATM switching device is disclosed, and the method may include the steps of recognizing a connection request message sent from one calling subscriber, including information concerning other n–1 called subscribers in the asynchronous transfer mode switching device transmitting the connection request message to the n–1 called subscribers, and transmitting a response to the calling subscriber from the n–1 called subscribers from the asynchronous transfer mode switching device; and establishing bidirectional connections between the calling subscriber and the called subscribers.

19 Claims, 9 Drawing Sheets

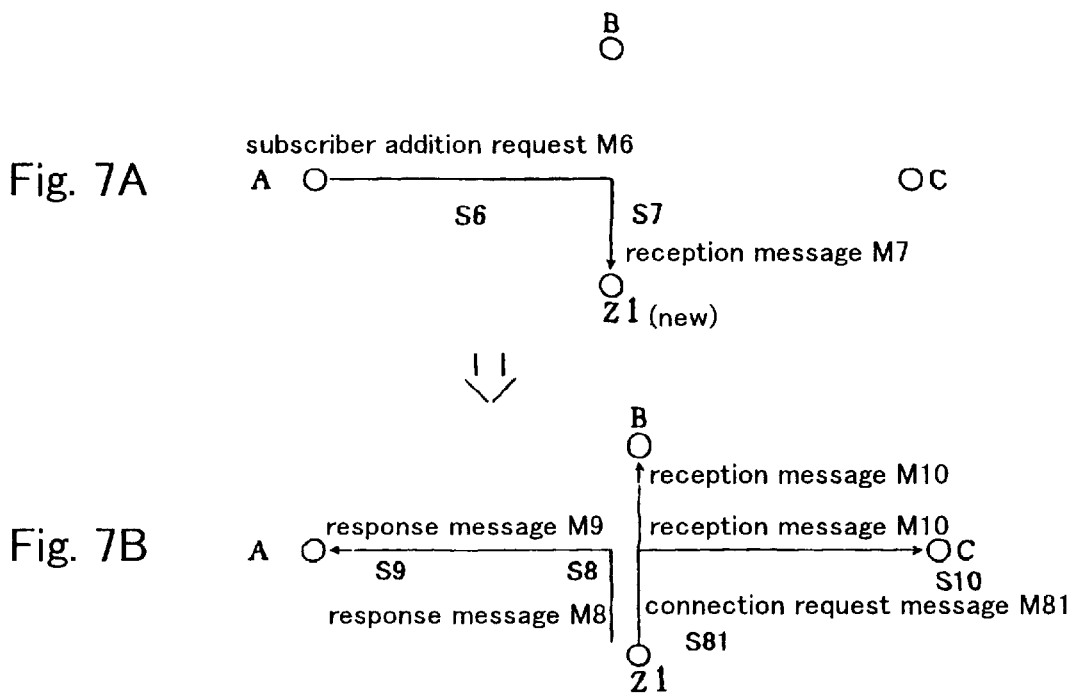
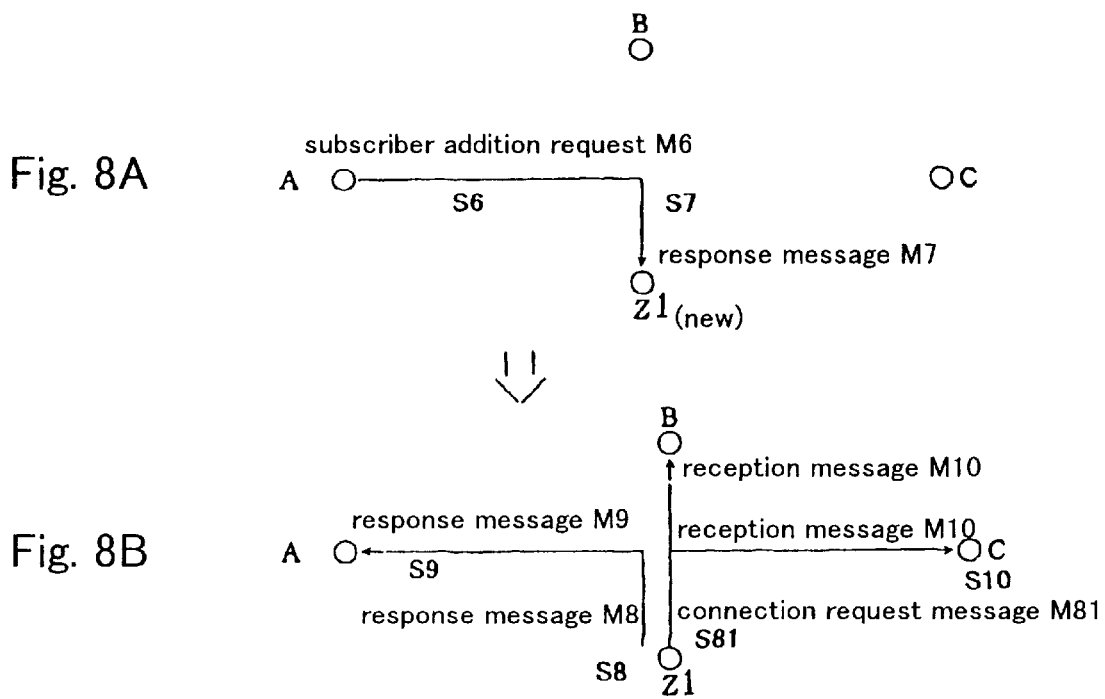

METHOD FOR FORMING MULTIPLE BIDIRECTIONAL CONNECTIONS FOR USE IN ASYNCHRONOUS TRANSFER MODE SWITCHING DEVICE

BACKGROUND OF THE INVENTION

1. Field of the Invention

The present invention relates to a connection method for an ATM (asynchronous transfer mode) switching system, and in particular to a connection method that enables multiple bidirectional connections.

2. Related Arts

An ATM switching system has been introduced wherewith a cell having a header and a data portion is transmitted to a destination address by changing, in consonance with a virtual path identifier and a virtual channel identifier contained in the header, the route selected at a switch.

For such an ATM switching system, however, procedures for establishing a bidirectional connection and multiple connections, and required information have not yet been defined.

Taking the foregoing into consideration, the setting up of the matters enumerated below is required to establish the bidirectional and multiple connections.

1. A method of sending and receiving signals by subscribers and required data when multiple connections are established.

2. Specifying of mixing points, for example, for the mixing performed at a switching device.

3. A method of sending and receiving signals between subscribers and required data when a specific subscriber is nearby joined on multiple connections is already established.

4. A method for selecting a mixing method.

5. A method of sending and receiving signals by subscribers and required data, when a specific subscriber is to be released from multiple connections.

6. A method of sending and receiving signals by subscribers and required data, when multiple connections are to be terminated.

7. A method for changing a mixing method.

8. A means for preventing transmission of invalid message from a switching device to a subscriber.

SUMMARY OF THE INVENTION

It is, therefore, one object of the present invention to provide a method for establishing those matters that are required for bidirectional and multiple connections performed by an ATM switching device, and for implementing the bidirectional and multiple connections.

To achieve the above object of the present invention, a method for performing bidirectional multiple connections, for an asynchronous transfer mode switching device, may include the steps of:

recognizing a connection request message sent from one calling subscriber, including information concerning other n−1 called subscribers in said asynchronous transfer mode switching device; transmitting said connection request message to said n−1 called subscribers, and transmitting a response to said calling subscriber from said n−1 called subscribers from said asynchronous transfer mode switching device; and establishing bidirectional connections between said calling subscriber and said called subscribers.

More objects and construction of the present invention will become clear by the following descriptions of the embodiments of the present invention, along with the drawings.

BRIEF DESCRIPTION OF THE DRAWINGS

FIGS. 7A and 7B are diagrams showing an example in the second embodiment in FIGS. 4A and 4B for adding a new subscriber Z1;

FIGS. 8A and 8B are diagrams showing an example in the third embodiment in FIGS. 5A and 5B for adding a new subscriber Z1;

DETAILED DESCRIPTION OF THE PREFERRED EMBODIMENTS

Figure 1:
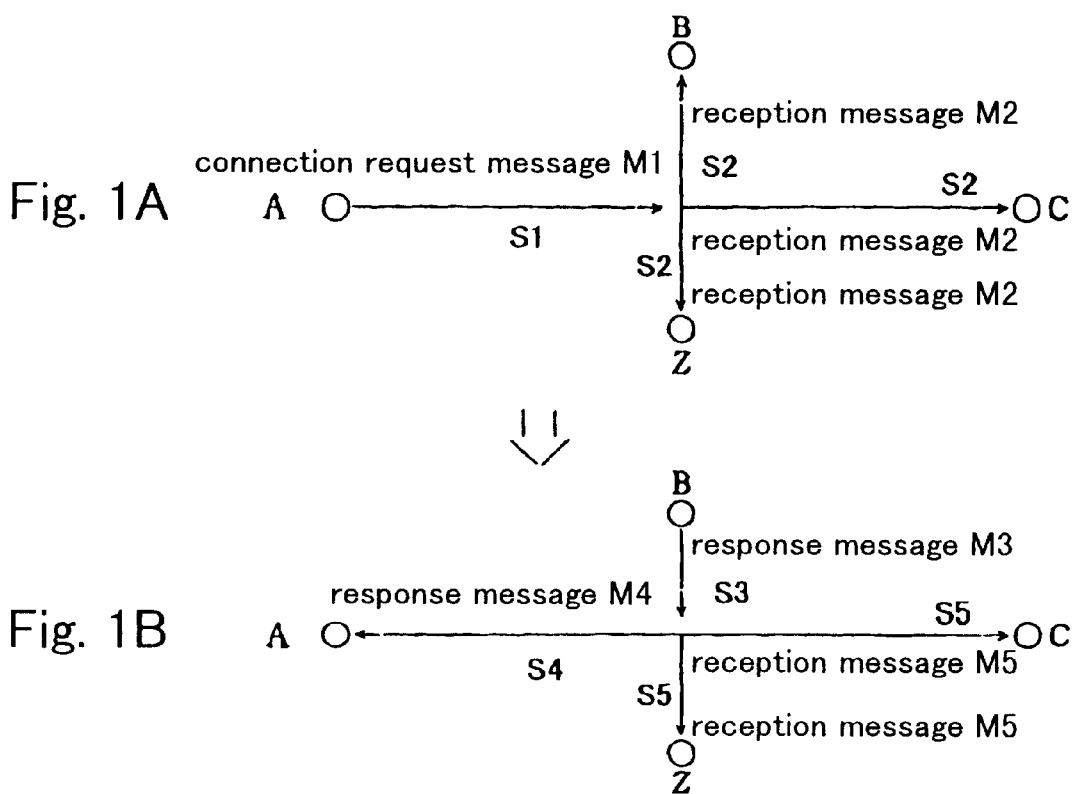
FIGS. 1A and 1B are diagrams for explaining a first embodiment for performing bidirectional multiple communication according to the present invention.

The preferred embodiments of the present invention will now be described while referring to the accompanying drawings. The same reference numerals or symbols are used to denote corresponding and identical components in the drawings.

FIGS. 1A and 1B are diagrams for explaining the process when, in response to a connection request issued by a subscriber A, three other subscribers, B, C and Z, establish bidirectional multiple communications among them.

A brief explanation will first be given for an example operation for establishing multiple connections for the bidirectional multiple communication.

First, in FIG. 1A, subscriber A, who requests to establish multiple connections, designates the subscribers, B, C and Z, will who participate in the multiple connections, and transmits a connection request message (M1) to an ATM switching device (hereinafter referred to simply as a switching device) (step S1).

In consonance with subscriber information included in the message M1, the switching device transmits a reception message (M2) received from subscriber A to the associated subscribers (step S2).

Upon receipt of this reception message (M2), in FIG. 1B, each subscriber transmits a response message (M3) to the switching device (step S3). The switching device transfers the response messages to the requesting subscriber A (step S4). After this, connections between subscriber A and the other subscribers are established.

In order to establish connections between the subscribers, when the switching device receives from the subscribers the response message (M3), a reception message (M5) received from one of subscribers who has transmitted a response is transmitted to the other subscribers, with the exception of subscriber A (step S5).

In the example shown in FIG. 1B, when the switching device has received a response message (M3) from the subscriber B, a reception message (M5) transmitted from the subscriber B is transmitted to all subscribers other than the subscribers A and B.

When the individual subscribers respond to the reception message (M5), the connections among the subscribers may be established.

The contents of the above messages will now be examined.

Transmission band information and the traffic level information concerning the connection, which are included in the connection request message (M1) from subscriber A, are transmitted to the switching device and to the individual subscribers. And it is assured that the information from subscriber A will be transmitted to other subscribers using the transmission band and the traffic level that subscriber A requested.

Information concerning whether or not mixing is required, which is included in the connection request message (M1) from subscriber A, is held by the switching device. When the connection of the other subscribers to subscriber A are to be made, the above information is used to determine whether to connect a single physical line or n−1 physical lines to subscriber A.

For the determination of a method for using a mixing required flag or a mixing not required flag in the connection request message, and a mixing required flag or a mixing not required flag in the subscriber data, whether or not the switching device is to perform mixing for the connection leading to subscriber A may be specified in the connection request message (M1) from subscriber A, or may be specified in the subscriber data.

In this case, by employing the definitions for the flags, there is an increase in the number of methods that may be selected to refer to the flags in the message and in the subscriber data.

The band information and the traffic level information concerning the connection, which are transmitted to subscriber A by a specified subscriber other than subscriber A, are reported to the switching device and to the individual subscribers. Thus, it is assured that the information from the specified subscriber is transmitted to the other subscribers using the band and the traffic level that were requested by that subscriber.

Information, from all subscribers other than subscriber A, concerning the requirement for mixing, is also held by the switching device. So when connections between a specific subscriber and the other subscribers are made, and the switching device performs mixing for these connections, the above information is used to determine whether to connect a single physical line or n−1 physical lines to the specific subscriber.

Connection destination subscriber information, which is included in the connection request message (M1) from the subscriber A, is held by the switching device. When the switching device identifies responses from individual subscribers that are related to the connection request message (M1) from the subscriber A, information concerning those subscribers to whom a specific subscriber should issue a connection request can be acquired from the information held by the switching device.

In the example shown in FIGS. 1A and 1B, when the switching device identifies the response message (M3) from subscriber B, it can be determined, by referring to the pertinent data, that the reception message (M5) should be transmitted to all concerned subscribers other than the subscribers A and B.

The connection request message (M1) transmitted from subscriber A to the switching device includes the following information:

band information (how much data is to be transferred) concerning the connection leading away from the subscriber A, and traffic level information (condition when traffic is congested);

a flag indicating whether or not mixing by the switching device for the connection leading to subscriber A is required;

a use method and definitions for a flag in a message and a flag in a subscriber data table, when the flag indicating whether or not the mixing for the connection leading to subscriber A is present in a subscriber data table in the memory of the switching device (the method and definitions are determined in accordance with a predetermined rule when flag information is also present in the subscriber data table); and phone number information for all subscribers that are to be connected.

The reception message (M2), into which the connection request message (M1) is converted by the switching device and which is transmitted to the other subscribers, B, C and Z, that are to be connected, includes the following information:

band information concerning the connection leading away from subscriber A and traffic level information;

call identification information (for each subscriber) a called subscriber requires to ascertain whether a received message is related to the call;

message identification information (for each subscriber) required by a subscriber to identify another subscriber, from among those with whom in communication, for whom the received message is used; and information concerning a called subscriber.

The response message (M3) from a subscriber for which a connection is requested includes the following information:

call identification information for each subscriber;

message identification information for each subscriber;

band information and traffic level information concerning the connection leading away from subscriber B;

a flag indicating whether or not mixing by the switching device for the connection leading to the subscriber B is required; and a use method and definitions for a flag in a message and a flag in a subscriber data table in a memory of a switching device, which will be described later, when the flag indicating whether the mixing for the connection leading to the subscriber B is present in a subscriber data table in the memory of the switching device, with the last three items being the same as those included in the connection request message from subscriber A.

The response message (M4) from subscriber B, who received the connection request from subscriber A forwarded by the switching device, includes the following information:

band information concerning a connection leading away from subscriber B and traffic level information;

call identification information for each subscriber; and message identification information for each subscriber.

The reception message (M5), which is transmitted to the other subscribers, C and Z, for whom connection is requested, includes the following information:

call identification information (for each subscriber) a called subscriber requires to ascertain whether a received message is relevant to the call;

message identification information (for each subscriber) required by a subscriber to identify another subscriber, from among those with whom in communication, for whom the received message is used;

information concerning a called subscriber; and band information concerning the connection leading away from subscriber B and traffic level information.

Figure 2:
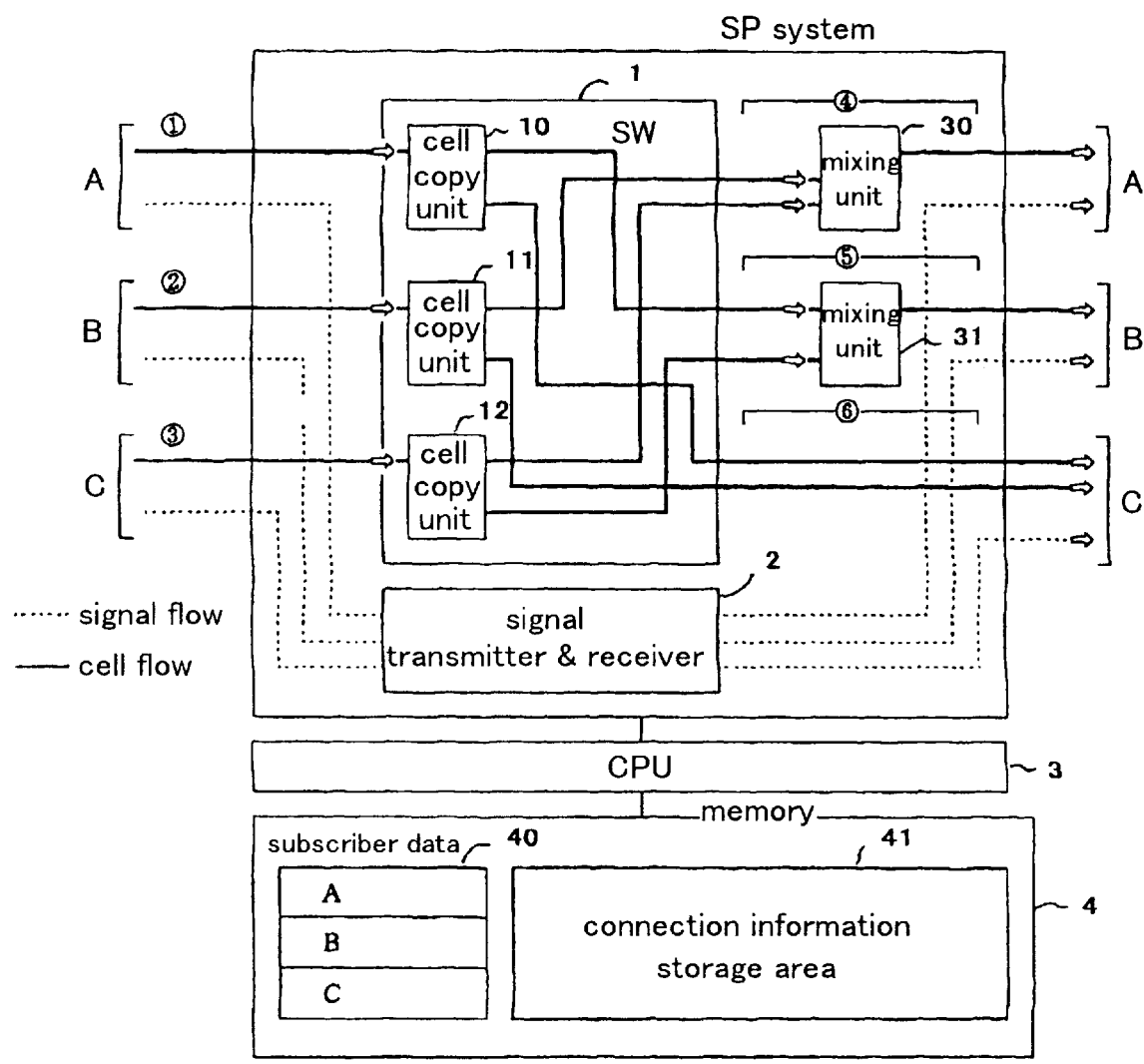
FIG. 2 is a diagram illustrating the arrangement of a switching device to which is applied a method of multiple connections for ATM exchange according to the present invention.

FIG. 2 is a block diagram illustrating a switching device for which a multiple connection system for ATM switching is applied according to one embodiment of the present invention. The switching device comprises an ATM switch 1, a signal transmitter and receiver 2, and mixing units 30 and 31 in a signal path (SP) system. The ATM switch 1 has cell copy units 10, 11 and 12, a CPU 3, which controls all functions of the switching device, and a memory 4.

The memory 4 has a subscriber table 40 in which subscriber data are stored, and a connection information storage area 41 in which is stored information concerning connections between subscribers, which will be described in detail later.

When, in accordance with a connection request from a specific subscriber, connections with the remaining n-i subscribers are to be established, the cell copy units 10, 11 and 12 form one connection leading away from a specific subscriber to the other n−1 subscribers, i.e., downstream, and copy cells along the connection to transmit them to the other n−1 subscribers.

Using the structure of the switching device in FIG. 2, an example for performing bidirectional multiple communication among subscribers A, B and C will be explained. In FIGS. 3A through 3E are shown separate procedures for the process depicted in FIGS. 1A and 1B.

Figure 3A:
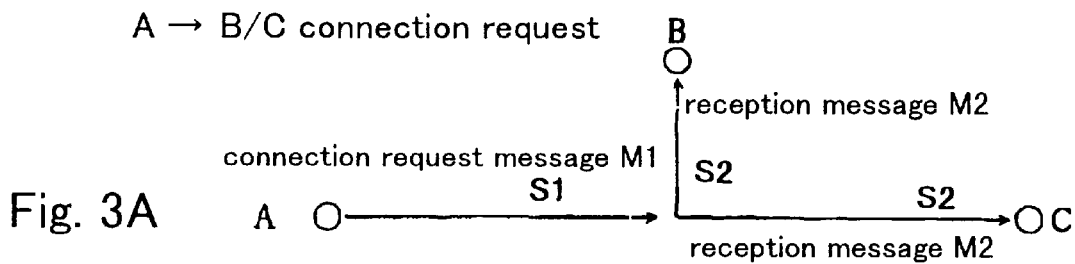
FIGS. 3A through 3E are diagrams separately showing the individual procedures in FIGS. 1A and 1B.

First, a connection request message (M1) requesting subscribers B and C be connected is transmitted from subscribers the switching device (step S1: FIG. 3A). This message is received by the signal transmitter and receiver 2 of the switching device in FIG. 2. Then, a check is performed to determine whether or not the above described information included in the connection request message (M1) is correct, and where in the memory 4 the information is stored.

When it is ascertained that the contents of the message are correct, information for multiple connections of subscribers A, B and C is entered in the multiple connection subscriber information table in the connection information storage area 41 in the memory 4 shown in FIG. 2. In addition, the information in the connection request message (M1) is entered as subscriber A connection information in the multiple connection subscriber information table in the connection information storage area 41 in the memory 4.

Then, the reception message (M2) received from the subscriber A is transmitted to subscribers B and C (step S2: FIG. 3A). At this time, the call identification information and the message identification information previously described are provided for the message received by subscribers B and C.

The call identification information and the message identification information are acquired by the switching device from the information included in the connection request message (M1) from subscriber A, and are set as connection information for subscribers B and C in the connection information areas in the multiple connection subscriber information table in the connection information storage area 41 in the memory 4.

In addition to this information, information concerning subscriber B and the band and traffic level information for the connection leading toward subscriber A are set in the message to subscriber B. The information concerning subscriber C and the band and the traffic level information for the connection leading toward subscriber A are set in the message to subscriber C.

Figure 3B:
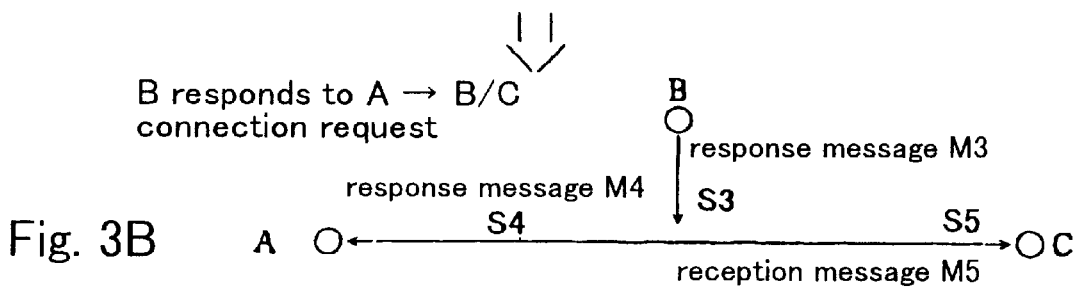

Thereafter, the response message (M3) from subscriber B is received by the signal transmitter and receiver 2 of the switching device (step S3: FIG. 3B). The response message (M3) includes the band and the traffic information, a mixing request for the switching device, and the call and message identification information. In accordance with the request included in the response message, the mixing unit 31 is prepared.

Since subscriber A also needs the mixing unit 30, it is prepared for use by subscriber A. As is shown, therefore, subscribers A and B are connected to each other through the mixing units 30 and 31 (see ②–④ and ①–⑤ in FIG. 2).

The band and the traffic level information, and a mixing request by the switching device, which are included in the response message (M3) from subscriber B, are stored in the multiple connection subscriber information table in the connection information storage area 41.

The band and the traffic level information from subscriber B and the call and the message identification information for subscriber A, which are provided by the signal transmitter and receiver 2 via the switching device, are added to the response message (M3) from subscriber B, and the resultant response message (M4) is transferred to subscriber A (step S4: FIG. 3B).

Upon receipt of the response message (M3) from subscriber B, the switching device adds, to the connection information in the message (M3), the call and the message identification information for a B-C connection, subscriber C information, and the band and the traffic level identification information for the connection leading to subscriber B. The resultant reception message (M5) is output to subscriber C by the signal transmitter and receiver 2 (step S5: FIG. 3B).

The call and the message identification information in the reception message M5 is stored as C connection information in the multiple connection subscriber information table in the connection in formation storage area 41.

Figure 3C:
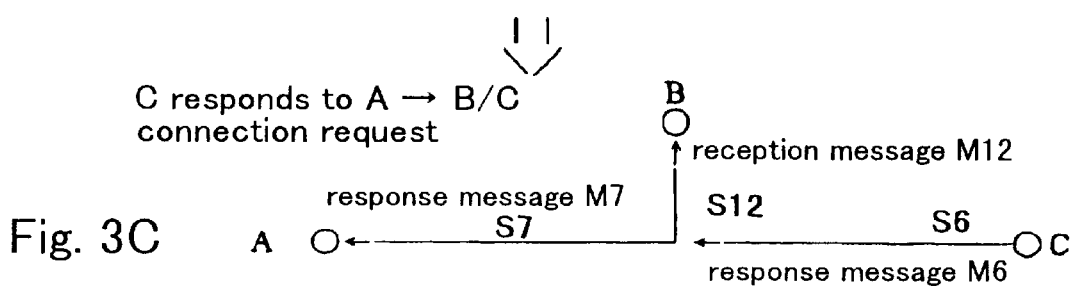

Thereafter, the response message (M6), related to the reception request from subscriber A to subscriber C, is returned from subscriber C (step S6: FIG. 3C).

Since a mixing request is not included in the response message (M6), the connection between subscribers A and C is performed without preparing the mixing unit (⑥ in FIG. 2). It should be noted that the connection leading away from the switching device to the subscriber A is performed via the mixing unit 30 (④ in FIG. 2).

Further, the band and the traffic level information from subscriber C, and information that mixing in the switching device is not required are stored as subscriber C connection information in the multiple connection subscriber information table in the connection information storage area 41.

The band and the traffic information from subscriber C, and the calling and message identification information for subscriber A-C connection are added to the response message (M6), and the response message (M7) is transferred to subscriber A (step S7: FIG. 3C).

Following this, in order to set the connection between the subscribers C and B, the switching device acquires the connection information for subscriber B from the multiple connection subscriber information table in the connection information storage area 41. The calling and the message identification information for subscriber C-B connection, subscriber B information, and the band and the traffic information for the connection leading to subscriber C are added to the connection information for subscriber B. The reception message (M12) is transferred as a reception request to subscriber B (step S12: FIG. 3C).

Figure 3D:
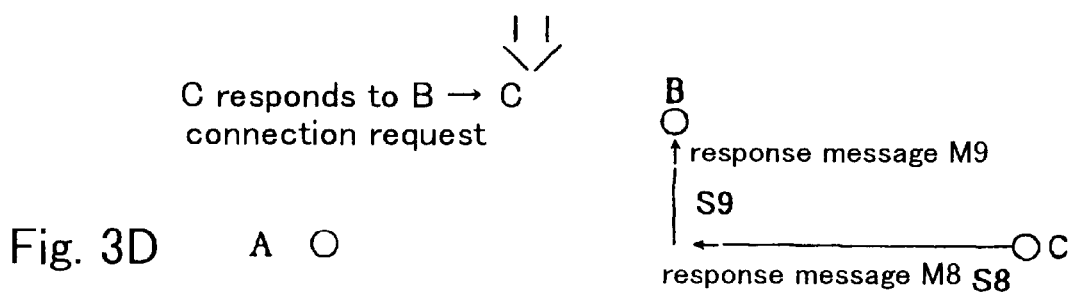

After the transmission of the reception message (M12), the response message (M8) from subscriber C is received (step S8: FIG. 3D), and is transferred as the response message (M9) to requesting subscriber B via the switching device (step S9: FIG. 3D).

Since the information included in the response message (M9) has already been set as subscriber C information in the multiple connection subscriber information table in the connection information storage area 41, restorage of the information is not required.

At this time, the subscriber B-C connection is performed. It should be noted that the connection leading from the switching device to subscriber B is performed via the mixing unit 31 (③–⑤ in FIG. 2), and the connection leading from the switching device to subscriber C is performed in consonance with the band and the traffic level information for subscriber B, which is included in the response message transferred from subscriber B to subscriber C.

Figure 3E:
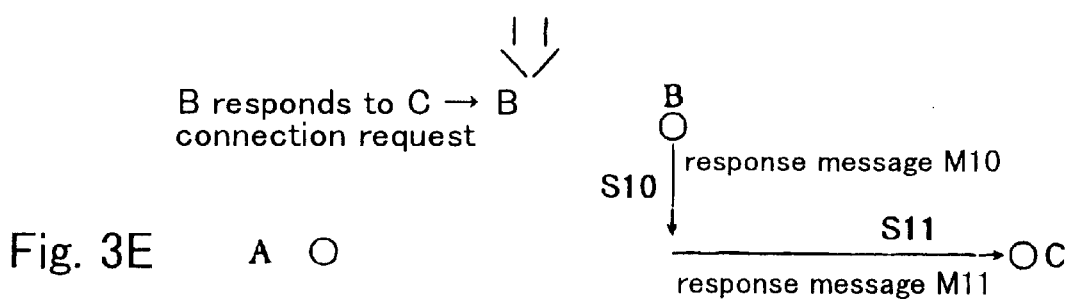

The response message (M1O: FIG. 3E) relative to the reception request from subscriber C to subscriber B is returned from subscriber B (step S10). Since the connection has already been set, the switching device only transfers it to subscriber C as a response message (Ml1: FIG. 3E) (step S11).

Figure 4A:
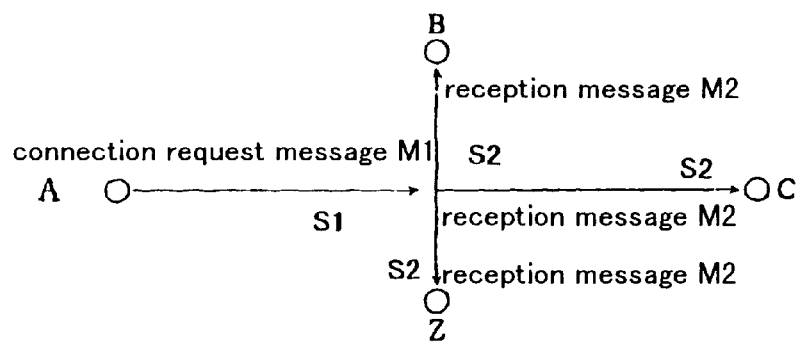
FIGS. 4A and 4B are diagrams showing a system, according to a second embodiment of the present invention, where received information is transmitted together with information about another subscriber, and a new connection request is issued by the reception side.
Figure 4B:
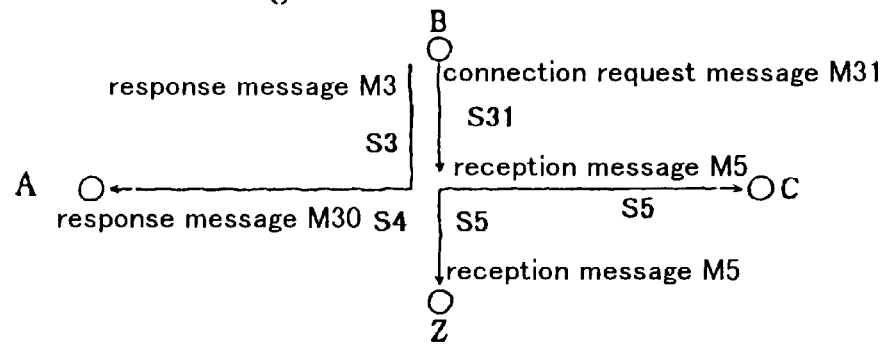

FIGS. 4A and 4B show a system according to a second embodiment of the present invention whereby information that is received is transferred, together with information for another subscriber, to a called subscriber, who then issues a new connection request.

In FIG. 4A, connection request message (M1) from subscriber A, which includes the same information as in the first embodiment, is output (step SI). Reception message (M2: step S2), which is transmitted by the switching device to subscribers B, C and Z, includes information for all the subscribers that are to be connected, in addition to the information transmitted in the first embodiment in FIGS. 1A and 1B. Upon receipt of the reception message (M2), subscriber B transmits response message (M3) to subscriber A requesting connection (step S3). The response message (M3) includes:

band information and traffic level information concerning a connection leading away from a pertinent subscriber;

a flag indicating whether or not mixing by the switching device relative to a connection leading to the pertinent subscriber is required; and call identification information for each subscriber and message identification information for each subscriber.

Further, in FIG. 4B, the switching device receives a flag that indicates whether or not mixing by the switching device relative to the connection leading to the pertinent subscriber is required, and transmits to subscriber A the response message (M30), which includes band information and the traffic level information concerning the connection leading away from the pertinent subscriber, the call identification information for each subscriber, and the message identification information for each subscriber (step S4).

Called subscriber B transmits to the switching device a connection request message (M31) for the other subscribers, A, C and Z (step S31).

The connection request message (M31) includes:

band information and traffic information concerning a connection leading away from subscriber B;

a flag indicating whether or not mixing by the switching device relative to a connection leading to the subscriber B is required;

a flag for determining the mixing condition when subscriber information includes the flag indicating whether or not mixing for the switching device is requested;

call identification information and message identification information with which the switching device recognizes a response message concerns specific subscribers for a specific call; and subscriber information for a subscribers who are to be connected, except for subscriber A.

The connection request message (M31) is converted by the switching device, and reception message (M5) is transmitted to the other subscribers, C and Z. The reception message (M5) includes the following information:

information concerning transmission destination;

band information and traffic level information concerning the connection leading away from subscriber B;

call identification information with which a called subscriber requires to ascertain whether a received message is related to a specific call;

message identification information required to identify another subscriber, from among those with whom in communication, for whom the received message is used; and subscriber information for subscribers who are to be connected, except for subscribers A and B.

With the above described structure in FIGS. 4A and 4B, an example operation for establishing a multiple connections will now be described in detail.

First, in FIG. 4A, subscriber A, who requests the multiple connections, specifies the subscribers who will participate in the multiple connections, and transmits the connection request message (M1) to the switching device (step S1). In consonance with the subscriber information included in the connection request message (M1), the switching device simply transmits, to the specified subscribers, reception message (M2) from subscriber A (step S2). This processing is the same as that performed in the first embodiment.

At this time, in the reception message (M2), the subscribers who subscriber A specified to in the multiple connections are set again. Upon receipt of the reception message M2, in FIG. 4B, the individual subscribers transmit response messages (M3) to the switching device (step S3). The switching device transfers response messages (M30) to the requesting source, that is, subscriber A (step S4). Thereafter, the subscriber A and the other individual subscribers can be connected.

Further, a specific subscriber provides not only the response message (M3) but also information for subscribers, other than himself and subscriber A, who participate in the multiple connections, and transmits a connection request message (M31) to the switching device (step S31).

Upon receipt of the new connection request message (M31), the switching device outputs reception message (M5) in consonance with the subscriber information included in the message (M31). When the individual subscribers respond to the reception message (M5), the connection between the subscribers can be established.

The contents of the messages for this embodiment shown in FIGS. 4A and 4B will be explained.

Most of the information included in the messages are the same as that provided in the first embodiment in FIGS. 1A and 1B.

More specifically, the band information and the traffic level information concerning the connection leading away from subscriber A; the mixing information received from subscriber A; the employment method and the definitions for a mixing flag in the message and a mixing flag in subscriber information; the band information concerning the connection leading away from a subscriber other than the subscriber A and the traffic level information; the mixing information received from a subscriber other than subscriber A; the employment method and definitions for a mixing flag in the message and a mixing flag in subscriber information; and connection destination subscriber information in the connection request message from subscriber A are the same as those in the first embodiment in FIGS. 1A and 1B.

The multiple connection subscriber information is provided for each subscriber from the connection destination subscriber information that is included in the reception message (M5) received from the switching device. Then, the pertinent subscriber can name a specific subscriber and transmit a newconnectionrequest message. Such information can be employed for another application (a disconnection, etc.).

Figure 5A:
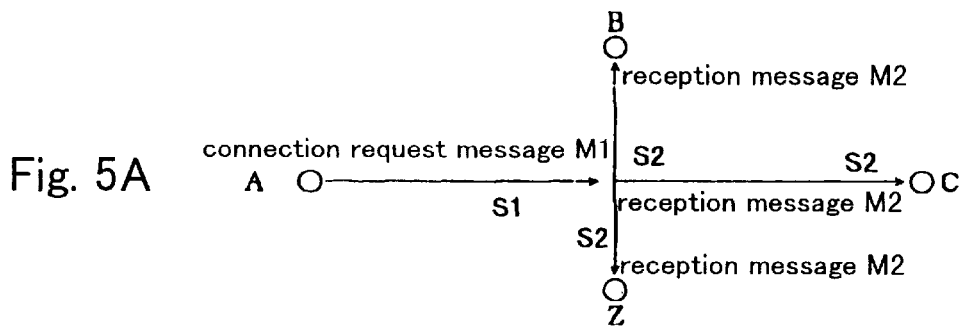
FIGS. 5A and 5B are diagrams showing a system, according to a third embodiment of the present invention, where received information is transmitted without information about another subscriber, a new connection request is issued by the reception side, and the switch device receives this request and sends connection request to another subscriber.
Figure 5B:
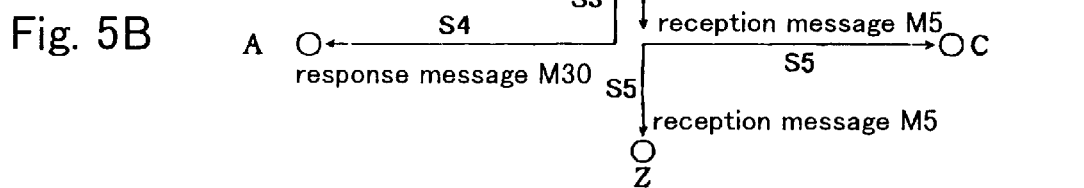

In a third embodiment in FIGS. 5A and 5B, the multiple connection subscriber information are stored only in the switch device, reception information is transmitted without the information for another subscriber to a reception side, which issues a new connection request. In FIG. 5A, a connection request message (M1) that is transmitted from connection requesting subscriber A is the same as that in the first embodiment.

The connection request message (M1) includes the same information as in the first embodiment:

band information and traffic level information concerning a connection leading away from subscriber A;

a flag indicating whether or not mixing by the switching device for the connection leading to subscriber A is required;

a flag for determining the mixing condition when subscriber information includes the flag indicating whether or not mixing in the switching device is required; and information for subscribers to be connected.

The information when the reception message (M2) is transmitted from the switching device to the individual reception subscribers is the same as explained while referring to FIGS. 1A and 1B.

In response to the message (M2), in FIG. 5B, the response message (M3) is transmitted from subscriber B to subscriber A, who has transmitted the connection request message (M1), and the response message (M30), which is obtained by converting the response message (M3), is transmitted from the switching device to the subscriber A. The information included in the messages M3 and M30 is the same as that explained in the first embodiment while referring to FIGS. 1A and 1B.

The connection request message (M32), in FIG. 5B, includes the same as the message (M31) in FIG. 4B without the informations of subscribers to participate in the multiple connections.

And, the message (M5), what the switch device converts from connection request message (M32) to and transmits to subscribers C and Z, is the same as reception message (M5), in FIG. 1B.

With the structure in FIGS. 5A and 5B, an operation example for establishing multiple connections will now be described in detail.

Subscriber A, who requests the multiple connections, designates the subscribers to participate in the multiple connections, and transmits the connection request message (M1) to the switching device (step S1) in FIG. 5A. In consonance with the subscriber information included in the connection request message (M1), the switching device simply transmits, to the pertinent subscribers, the reception message (M2) (step S2). At this time, the information for the subscribers who are designated by subscriber A to participate in the multiple connections is held by the switching device. This processing is the same as in the first and the second embodiments in FIGS. 1A, 1B, 4A and 4B.

Upon receipt of the reception message (M2), the individual subscribers transmit the response messages (M3) to the switching device (step S3). The switching device transfers these response messages (M30) to requesting source subscriber A (step S4). Thus, the connections between subscriber A and the other subscribers are enabled.

A pertinent subscriber transmits not only the response message (M3) but also a connection request message (M32) to the switching device (step S32). Upon receipt of the connection request message (M32), the switching device transmits the reception message (M5) to all the subscribers other than subscriber A and the connection requesting source subscriber, in consonance with the multiple connection subscriber information (step S5).

When, for example, subscriber B has issued the connection request (M32) in FIG. 5B, the switching device transmits the reception message (M5) to the subscribers other than subscribers A and B. When the individual subscribers respond to the reception message (M5), the connection between these subscribers are enabled.

The contents of the messages in the third embodiment in FIGS. 5A and 5B will now be explained.

The contents of the messages in this embodiment are the same as those in the embodiments shown in FIGS. 1A, 1B, 4A and 4B.

More specifically, the band information and the traffic level information concerning the connection leading away from subscriber A; the mixing information received from subscriber A; the method and the definition for a mixing flag in the message and a mixing flag in subscriber information;

the band information and the traffic level information concerning the connection leading away from subscribers other than subscriber A; the mixing information received from subscribers other than subscriber A; and connection destination subscriber information in the connection request message from subscriber A are the same as those in the first and the second embodiments in FIGS. 1A, 1B, 4A and 4B.

Figure 6A:
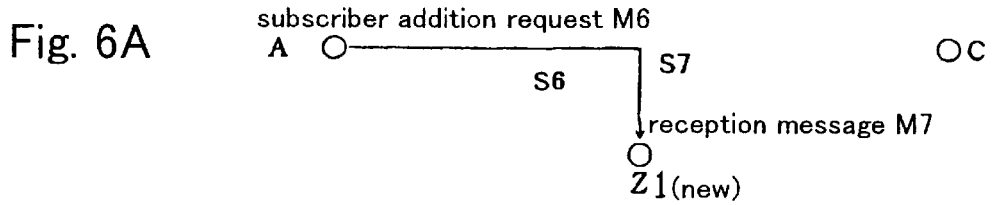
FIGS. 6A and 6B are diagrams showing an example in the first embodiment in FIGS. 1A and 1B for adding a new subscriber Z1.
Figure 6B:
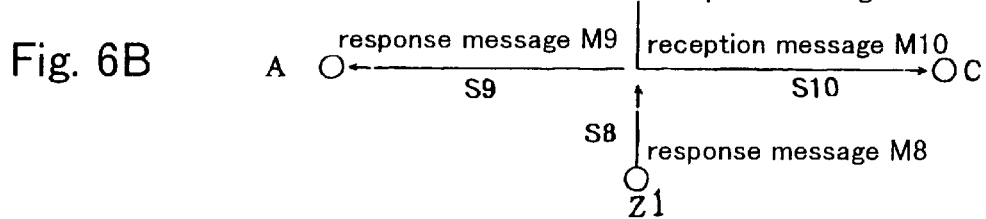

In FIGS. 6A and 6B are an example where new subscriber Z1 is added for the first embodiment in FIGS. 1A and 1B. A subscriber addition request (M6) is transmitted from subscriber A to new subscriber Z1 via the switching device. The subscriber addition request (M6) includes the following information:

information for an additional subscriber to be connected (new subscriber Z1);

band information and traffic level information concerning a connection leading away from subscriber A;

a flag indicating whether or not mixing in the switching device relative to the connection leading to subscriber A is required; and a flag for determining the mixing condition when subscriber information includes the flag indicating whether or not mixing by the switching device should be required.

A reception message (M7) that is transmitted by the switching device to the new subscriber Z1 includes the following information:

information for a transmission destination, i.e., for a new subscriber;

band information and traffic level information concerning the connection leading away from the subscriber A;

call identification information with which a called subscriber requires to ascertain whether a received message is relevant to a pertinent call; and message identification information required to identify another subscriber, from among those with whom in communication, for whom the received message is used.

Response message (M8) transmitted by subscriber Z1 upon receipt of the message (M7) includes the following:

band information and traffic level information concerning a connection leading away from a pertinent subscriber;

a flag indicating whether or not mixing by the switching device relative to a connection leading to the pertinent subscriber is required;

a flag for determining the mixing condition when subscriber information includes the flag indicating whether mixing by the switching device is required;

call identification information for enabling the switching device to ascertain whether or not a subject message is relevant to subscribers associated with the pertinent call; and message identification information.

Message (10) that is transmitted from the switching device to the other subscribers B and C includes the following information:

information for a transmission destination;

band information and traffic level information concerning the connection leading away from a pertinent subscriber;

call identification information with which a called subscriber requires to ascertain whether a received message is relevant to a pertinent call; and message identification information required to identify another subscriber, from among those with whom in communication, for whom the received message is used.

Response message (M9) is transmitted to subscriber A, who has transmitted a connection request to added subscriber Z1. The response message (M9) includes band information and traffic level information concerning the connection leading away from subscriber Z1 that was contained in the response message (M8), call identification information and message identification information required by the switching device to ascertain whether the subject message is relevant to subscribers who are associated with a pertinent call.

With the structure shown in FIGS. 6A and 6B, an example operation for adding a new subscriber will now be explained in detail.

In FIG. 6A, subscriber A, who established the multiple connections, designates subscriber Z1 a new participant of the multiple connections, and transmits a subscriber addition request (M6) to the switching device (step S6).

In consonance with the subscriber information included in the subscriber addition request (M6), the switching device transmits reception message (M7) to the subscriber Z1 (step S7). At this time, information for the additional subscriber Z1 is stored by the switching device.

In FIG. 6B, upon receipt of the reception message (M7), subscriber Z1 transmits response message (M8) to the switching device (step M8). The switching device then transfers it as response message (M9) to request source, subscriber A (step S9). Thus, the connection between subscribers A and Z1 is enabled.

In addition, in accordance with the stored multiple connection subscriber information, the switching device transmits reception message (M10), converted by switch device, to subscribers B and C (step S10). When subscribers B and C respond to the message (M10), the connections among these subscribers are enabled.

An explanation of the contents of the messages in the example in FIGS. 6A and 6B follows.

The information that is included in the subscriber addition request (M6) issued by subscriber A, i.e., the band information and the traffic level information concerning the connection; the information concerning whether mixing is required; and the method and the definitions for a mixing flag and another mixing flag in subscriber information, is the same as is explained in the preceding embodiments.

The information from the additional subscriber, i.e., the band information and the traffic level information concerning the connection; the information concerning mixing; and the method and the definitions for a mixing flag in the message and a mixing flag in subscriber information, is the same as that in the preceding embodiments.

The information concerning the added subscriber that is included in the subscriber addition request (M6) from subscriber A is stored by the switching device, and added to the previously stored information concerning the multiple connection constituent subscribers.

FIGS. 7A and 7B show an example where a new subscriber Z1 is added in the second embodiment in FIGS. 4A and 4B. In FIG. 7A, the subscriber addition request (M6) from subscriber A to new subscriber Z1 includes the same information as that in the addition request message (M6) in the example shown in FIGS. 6A and 6B.

Further, message (M7) that is transmitted from the switching device to subscriber Z1 includes the information for subscribers B and C that are connected, in addition to the information in the message in FIG. 6A.

In FIG. 7B, upon receipt of the message (M7), subscriber Z1 transmits response message (M8) to subscriber A, as in the example shown in FIGS. 5A and 5B (step S8), and transmits connection request messages (M81) to subscribers B and C (step S81).

The switching device converts the response message (M8) into response message (M9), which is transmitted to subscriber A (step S9). Besides the response message (M8), the switching device transmits the connection request message (M81) that includes the subscriber information for all the subscribers who are to be connected except for the request source, i.e., subscriber A (step S81).

Then, the same message (M10) as that in the second embodiment in FIGS. 4A and 4B is transmitted by the switching device to the other subscribers, B and C (step S10).

With the structure shown in FIGS. 7A and 7B, an example operation for adding a new subscriber will now be described in detail.

Subscriber A, who established the multiple connections, designates a new participant of the multiple connections subscriber Z1, and transmits a subscriber addition request (M6) to the switching device (step S6). In consonance with the subscriber information included in the subscriber addition request (M6), the switching device transmits reception message (M7) to subscriber Z1 (step S7).

At this time, the information concerning subscribers who until now constituted the multiple connections is added to the reception message (M7). Further, the information for additional subscriber Z1 is stored by the switching device. Upon the receipt of the message (M7), subscriber Z1 transmits response message (M8) to the switching device (step M8). The switching device then transfers it as response message (M9) to the source of the request, subscriber A (step S9). Thus, the connection between subscribers A and Z1 is enabled.

Further, subscriber Z1 adds, to connection request message (M81), the information that is included in the received message concerning the subscribers that constitute the multiple connections, and transmits the message (M81) to the switching device (step S81).

In accordance with the subscriber information contained in the connection request message (M81), the switching device transmits the message (M10) from new subscriber Z1 to subscribers B and C (step S10).

When subscribers B and C respond to the message, the connections among them are enabled.

A description of the contents of the messages in the example shown in FIGS. 7A and 7B follows.

The process is the same as that for the second embodiment, except for the transmission of the subscriber data from the switching device to new subscriber Z1.

The subscriber information sent from the switching device to new subscriber Z1 includes information concerning the subscribers, other than subscriber A, who constitute the multiple connections. When new subscriber Z1 understands which subscribers constitute the multiple connections, the subscriber Z1 can send a message to an arbitrary subscriber.

An example message is a disconnection request. In this case, when information concerning a subscriber to be connected is added to a new connection request from the new subscriber, the switching device transmits the received message to the individual subscribers in accordance with that information.

FIGS. 8A and 8B show an example where new subscriber Z1 is added in the third embodiment shown in FIGS. 5A and 5B.

In FIG. 8A, subscriber addition request (M6) from subscriber A and a reception message (M7) from the switching device to new subscriber Z1 are the same as those in the example in FIG. 7A.

Response message (M8) from subscriber Z1 to subscriber A, connection request message (M81) to the other subscribers, B and C, and message (M10) sent by the switching device to subscribers B and C are also the same as those in the third embodiment.

With the structure shown in FIGS. 8A and 8B, an example operation for adding a new subscriber will now be described in detail.

Subscriber A, who established the multiple connections, designates subscriber Z1, a new participant of the multiple connections, and transmits a subscriber addition request (M6) to the switching device (step S6). In consonance with the subscriber information included in the subscriber addition request (M6), the switching device transmits the reception message (M7) to subscriber Z1 (step S7).

The information concerning the added subscriber that is included in the subscriber addition request (M6) is stored by the switching device.

Upon the receipt of the reception message (M7), the subscriber Z1 transmits response message (M8) to the switching device (step M8). The switching device then transfers it as response message (M9) to the request source, subscriber A (step S9). Thus, the connection between subscribers A and Z1 is enabled.

In addition, subscriber Z1 transmits the connection request message (M81) to the switching device (step S81). When the switching device recognizes the connection request message (M81) from the subscriber Z1, it transmits the message (M10) to subscribers B and C in consonance with the stored information concerning the subscribers that constitute the multiple connections (step S10).

When the subscribers B and C respond to the message (M1O), the connections between the subscribers are enabled.

The contents of the messages in FIGS. 8A and 8B are the same as those in the third embodiment.

Figure 9A:
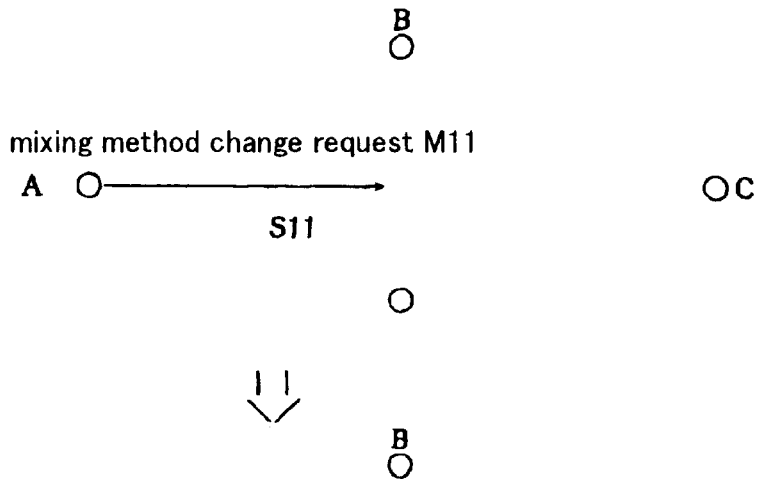
FIGS. 9A and 9B are diagrams for an example when mixing is changed.
Figure 9B:
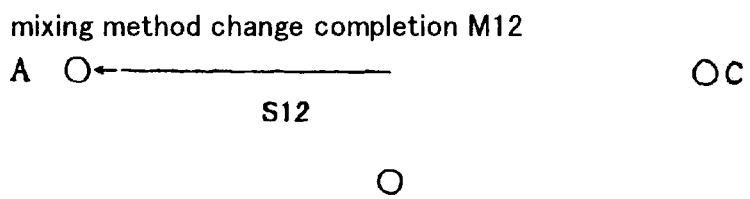

FIGS. 9A and 9B show a mixing example. Several mixing patterns are prepared in advance by the switching device. The switch device decides a mixing pattern, in accordance with the message received from the subscriber or by the pattern in subscriber data in the switch device, or by the combination of them. In FIG. 9A, a mixing method change request (M11) that includes mixing pattern information and the call and the message identification information for each subscriber is transmitted from subscriber A to the switching device (step S11).

In FIG. 9B, upon receipt of the request (M11), a mixing change completion notification (M12), which includes the call and the message identification information for each subscriber, is transmitted by the switching device to subscriber A (step S12).

The processing performed in FIGS. 9A and 9B for changing the mixing method will be explained in detail. When various mixing methods are prepared by the switching device, a specific subscriber who constitutes one of the participants in the multiple connections issues the mixing method change request (M11) to change his own mixing method (step S11) in FIG. 9A.

Upon receipt of the request, the switching device changes the mixing method as designated, and returns a completion message to the specific subscriber (M12) (step S12) in FIG. 9B.

The mixing method change request (M11) selects a mixing pattern that is prepared by the switching device.

Figure 10A:
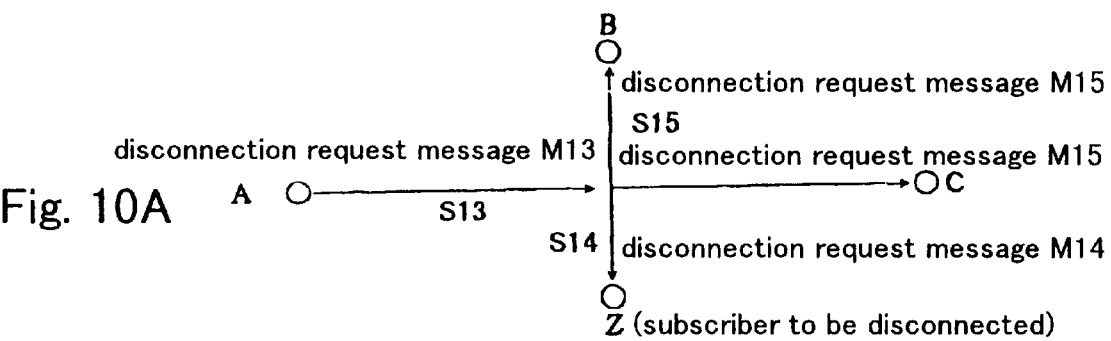
FIGS. 10A and 10B are diagrams showing an example in the first embodiment in FIGS. 1A and 1B for disconnecting a specific subscriber Z.
Figure 10B:
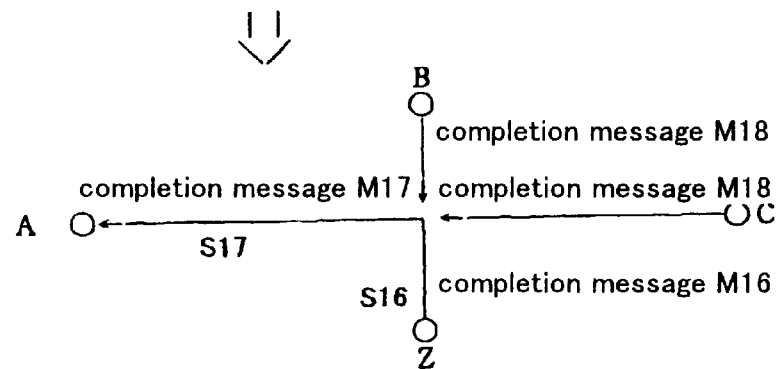

FIGS. 10A and 10B show an example where specific subscriber Z is disconnected from the connection in the first embodiment shown in FIGS. 1A and 1B. Disconnection request message (M13) is transmitted from subscriber A to the switching device (step S13) in FIG. 10A. The disconnection request message (M13) includes call identification information, which is required by the switching device to ascertain whether the subject message is relevant to the subscribers who are associated with a pertinent call; message identification information; and information concerning subscriber Z, who is to be disconnected.

Disconnection request message (M15) is transmitted from the switching device to the subscribers that are not to be disconnected (step S15). The message (M15) includes call identification information required by a called subscriber to ascertain whether a received message is relevant to the pertinent call; message identification information required by a called subscriber to identify another subscriber, from among those with whom in communication, for whom the received message is used; and message information.

Disconnection request message (M14), from the switching device to subscriber Z, who is to be disconnected, includes call identification information (step S14).

Completion message (M16), which is transmitted from subscriber Z who is to be disconnected to the switching device, also includes call identification information (step S16) in FIG. 10B. Further, completion message (M17), which is transmitted from the switching device to the subscriber requesting the disconnection, subscriber A, includes call identification information, which is required by a called subscriber to ascertain whether a received message is relevant to a pertinent call; and message identification information, which is required by the called subscriber to identify the subscriber, from among those with whom in communication, for whom the received message is to be used (step S17).

Completion message (M18), which is transmitted to the switching device by subscribers B and C, who are not disconnected, includes the call identification information and the message identification information, which is required by the switching device to ascertain whether the subject message is relevant to the subscribers who are associated with the pertinent call (step S18).

A detailed explanation will be given for the process in FIGS. 10A and 10B during which specific subscriber A transmits and receives messages for the disconnection of another subscriber, Z. Specific subscriber A, who established the multiple connections, selects arbitrary subscriber Z from among the subscribers that constitute the multiple connections, and transmits a disconnection request message (M13) to the switching device (step S13) in FIG. 10A.

When the switching device identifies this message, it transmits disconnection request message (M14) to pertinent subscriber Z (step S14), and transmits, to the other subscribers, disconnection request message (M15) for disconnection from pertinent subscriber Z (step S15) in FIG. 10A.

The subscriber for whom the disconnection is requested, subscriber Z, transmits the completion message (M16) to the switching device (step S16). The switching device transmits it as completion message (M17) to the requesting subscriber, A (step S17) in FIG. 10B. Then, the switching device waits until it receives from subscribers B and C the completion notification (M18) for disconnection from pertinent subscriber Z (step S18) in FIG. 10B.

The disconnection of the switching device from the pertinent subscriber may be performed upon receipt of a disconnection request from the subscriber A, or sequentially when it receives the disconnection completion notification.

Figure 11A:
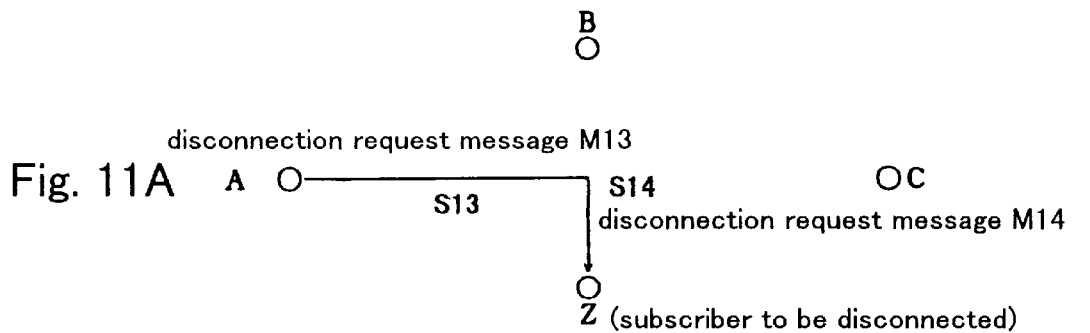
FIGS. 11A and 11B are diagrams showing an example in the third embodiment in FIGS. 5A and 5B for disconnecting a specific subscriber Z.
Figure 11B:
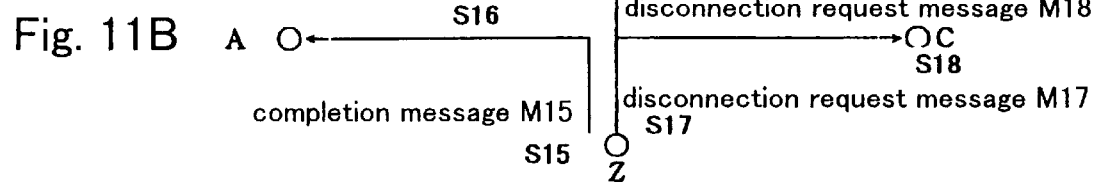

FIGS. 11A and 11B show an example where a specific subscriber Z is to be disconnected in the third embodiment in FIGS. 5A and 5B. Disconnection request message (M13) from subscriber A to a switching device includes call identification information and message identification information, which is required by the switching device to ascertain whether the subject message is relevant to the subscribers who are associated with a pertinent call; and information concerning subscriber Z, who is to be disconnected.

Disconnection request message (M14) from the switching device to subscriber Z, who is to be disconnected, includes call identification information.

Completion message (M15) transmitted to the switching device by subscriber Z, who is to be disconnected, also includes call identification information.

Completion message (M16) from the switching device to the subscriber requesting the disconnection, subscriber A, includes call identification information, which is required by a called subscriber to ascertain whether the received message is relevant to a pertinent call; and message identification information, which is required by the called subscriber to identify another subscriber, from among those with whom in communication, for whom the received message is to be used.

Disconnection request message (M17), which is transmitted to the switching device by subscriber Z, who is to be disconnected, includes call identification information and message identification information, which is required by the switching device to ascertain whether the subject message is relevant to the subscribers participating in the pertinent call.

Disconnection request message (M18) transmitted by the switching device to subscribers B and C, who are not to be disconnected, includes call identification information, which is required by a called subscriber to ascertain whether a received message is relevant to a pertinent call; message identification information, which is required by the called subscriber to identify the subscriber, from among those with whom in communication, for whom the received message is used; and call identification information and message information for a subscriber who is to be disconnected.

A detailed explanation will be given for the process in FIGS. 11A and 11B for transmitting and receiving messages when subscriber A disconnects another subscriber Z. In FIG. 11A, a specific subscriber A, who established the multiple connections, names an arbitrary subscriber from among the other subscribers that constitute the multiple connections, and transmits a disconnection request message (Ml3) to the switching device (step S13).

When the switching device identifies this message, it transmits disconnection request (Ml4) to the relevant subscriber Z (step S14). In FIG. 11B, when the switching device has received completion message (Ml5) from the relevant subscriber Z (step 15), it transfers it as completion message (Ml6) to the requesting source, subscriber A (step S16).

The pertinent subscriber Z transmits disconnection request message (M17) to the switching device to disconnect himself from the other subscribers (step S17).

The switching device refers to the stored multiple connection information to find the subscribers for whom a disconnection request is required, and transmits to them disconnection request message (M18) (step S18). Then, upon receipt of completion notifications from those subscribers, the disconnection process is terminated.

The disconnection of subscriber Z from the other subscribers may be performed when the switching device receives the disconnection request, or when it receives the completion notifications.

Figure 12A:
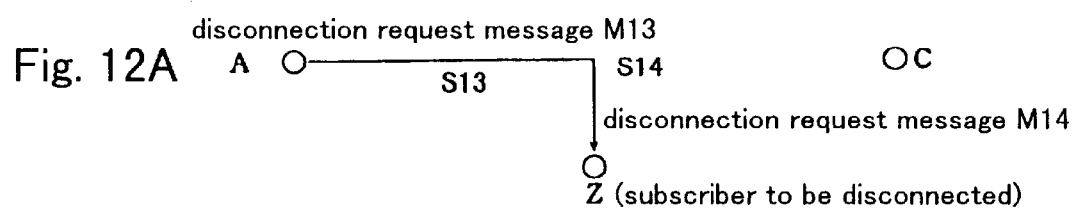
FIGS. 12A and 12B are diagrams showing an example in the second embodiment in FIGS. 4A and 4B for disconnecting a specific subscriber Z.
Figure 12B:
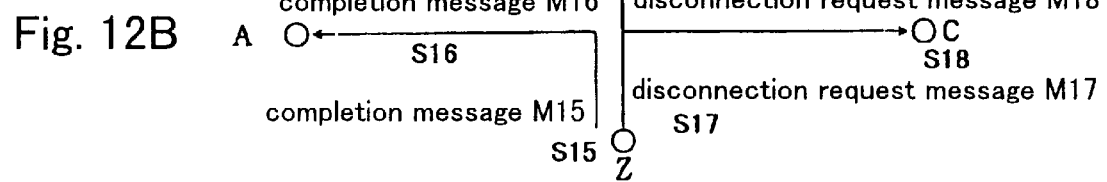

FIGS. 12A and 12B show an example where subscriber Z is to be disconnected in the second embodiment in FIGS. 4A and 4B.

Disconnection request message (M13) from subscriber A to the switching device includes call identification information and message identification information, which is required by the switching device to ascertain whether the subject message is relevant to pertinent subscribers participating in a pertinent call; and information concerning subscriber Z, who is to be disconnected.

Disconnection request message (M14) from the switching device to subscriber Z includes call identification information, the subscriber addition request (M6) and information concerning subscribers (except for subscriber A) to whom subscriber Z is connected. The completion message (M15) from subscriber Z to the switching device includes call identification information.

Completion message (M16), from the switching device to the subscriber requesting the disconnection, subscriber A, includes call identification information, which is required by a called subscriber to ascertain whether a received message is relevant to a pertinent call; and message identification information, which is required by the called subscriber to identify the subscriber, from among those with whom in communication, for whom the received message is used.

Disconnection request message (M17) from subscriber Z. who is to be disconnected to the switching device includes call identification information, which is required by the switching device to ascertain whether the subject message is relevant to the subscribers participating in a pertinent call, and information concerning subscribers (except for subscriber A) who are connected to subscriber Z.

Disconnection request message (M18), which is transmitted from the switching device to subscribers B and C, who are not to be disconnected, includes call identification information, which is required by a called subscriber to ascertain whether a received message is relevant to a pertinent call; message identification information, which is required by the called subscriber to identify the subscriber, from among those with whom in communication, for whom the received message is used; and call identification information and message information for subscriber Z, who is to be disconnected.

A detailed explanation will be given for the process in FIGS. 12A and 12B during which a specific subscriber A transmits and receives messages for the disconnection of another subscriber Z. In FIG. 12A, the specific subscriber A, who established the multiple connections, names an arbitrary subscriber Z from among the other subscribers that constitute the multiple connections, and transmits disconnection request message (M13) to the switching device (step S13).

When the switching device recognizes this message, it transmits disconnection request message (M14) to the pertinent subscriber Z (step S14). In FIG. 12B, when the switching device has received the completion message (M15) from the pertinent subscriber Z (step S15), it transfers it as completion message (M16) to the requesting subscriber A (step S16).

The pertinent subscriber Z transmits disconnection request message (M17) to the switching device to disconnect himself from the other subscribers (step S17). At this time, the information concerning the subscribers, except for the subscriber A, who are connected to subscriber Z is added to message (M17).

Upon receipt of the disconnection request message (M17), the switching device examines the subscriber information in the message (M17) to find those subscribers for whom a disconnection request is required, and transmits to them the disconnection request messages (M18) (step S18). Then, upon receipt of completion notifications from those subscribers, the disconnection process is terminated.

The disconnection of subscriber Z from the other subscribers may be performed when the switching device receives the disconnection request, or when it receives the completion notifications.

Subscriber Z. who is to be disconnected, holds the information concerning the subscribers to whom it is connected, and thus, upon receipt of the disconnection request (M14), subscriber Z adds that information to the disconnection request message (M17). Therefore, even when the switching device does not have information concerning the subscribers that constitute the multiple connections, it can transmit a disconnection request to all of the relevant subscribers.

Figure 13A:
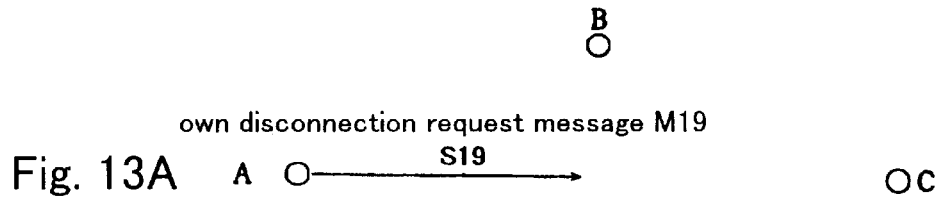
FIGS. 13A and 13B are diagrams showing an example when a specific subscriber voluntarily breaks a connection.
Figure 13B:
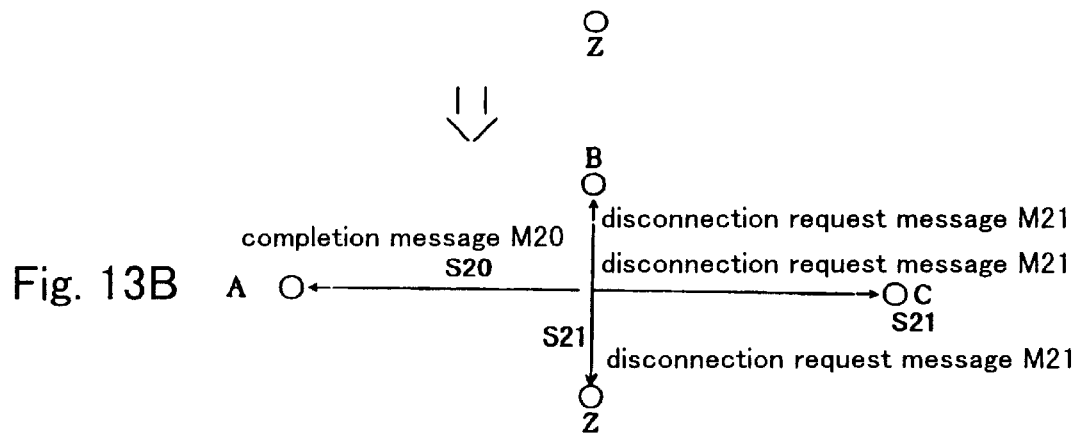

FIGS. 13A and 13B show an example where a specific subscriber voluntarily breaks the connection. Subscriber A transmits to the switching device a request message (M19) for releasing his own connection. The disconnection request message (M19) includes call identification information, which is used by the switching device to ascertain whether the subject message is relevant to a pertinent call.

Disconnection request message (M21), transmitted from the switching device to subscribers B, C and Z, who are not to be disconnected, includes call identification information, which is required by a called subscriber to ascertain whether a received message is relevant to a pertinent call; message identification information, which is required by the called subscriber to identify the subscriber, from among those with whom in communication, for whom the received message is used; and call identification information and message information concerning the subscriber A, who is to be disconnected.

Completion message (M20) from the switching device to the subscriber requesting the disconnection, subscriber A, includes call identification information.

A detailed explanation will be given for the process in FIGS. 13A and 13B, during which a specific subscriber A transmits and receives messages for releasing himself. The specific subscriber A, who established the multiple connections, transmits disconnection request message (M19) to the switching device to disconnect himself (step S19).

When the switching device recognizes this message, it transmits completion request (M20) to the subscriber A (step S20). In addition, the switching device transmits, to the remaining subscribers, disconnection request messages (M21) stating the disconnection is to be performed for the pertinent subscriber A (step S21). When the switching device receives completion notifications, the process is thereafter terminated.

The disconnection at the switching device may be performed upon receipt of the disconnection request, sending the disconnection request message to another subscribers, or receipt of the completion notifications.

In this example, a subscriber for which disconnection is requested is not named in the disconnection request subscriber information. When a request merely for a pertinent subscriber's disconnection is issued, the switching device can easily identify the pertinent subscriber for whom the disconnection is requested.

Figure 14A:
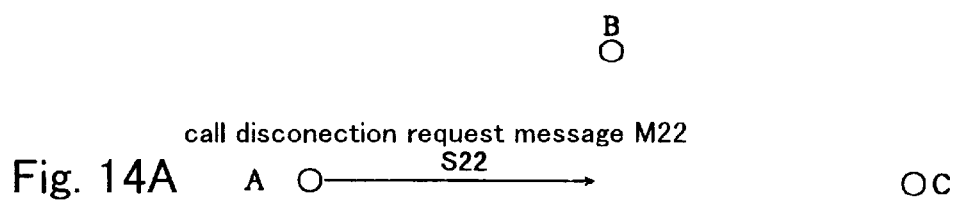
FIGS. 14A and 14B are diagrams illustrating an example when a call end request issued by a specific subscriber A is processed.
Figure 14B:
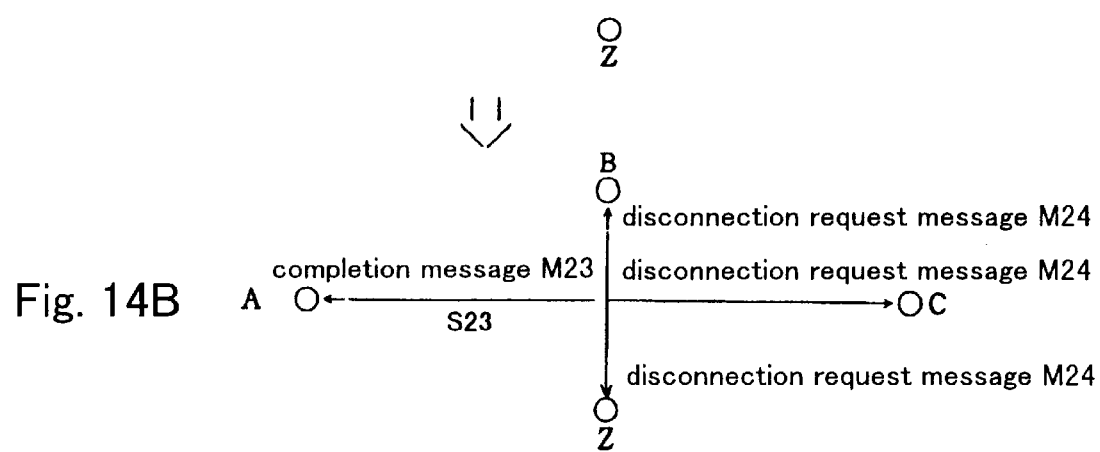

FIGS. 14A and 14B show an example where a subscriber A issues a call end request. Call end request message (M22) from subscriber A includes call identification information that is used by the switching device to ascertain whether the subject message is relevant to the pertinent call.

Disconnection request messages (M24) from the switching device to the other subscribers, B, C and Z, include call identification information, which is required by a subscriber to ascertain whether the subject message is relevant to the pertinent call. Completion message (M23) is transmitted to subscriber A who issued the call end message (M22).

An explanation will be given for the process during which subscriber A transmits and receives messages to disconnect himself. In FIG. 14A, a subscriber A that established the multiple connections transmits a call end message (M22) to the switching device to terminate the multiple connection (step S22).

In FIG. 14B, the switching device recognizes the message (M22) and transmits completion notification (M23) to subscriber A (step S23). In addition, the switching device transmits disconnection request messages (M24) to all the subscribers based on the information, which is stored by the switching device, concerning the subscribers that constitute the multiple connections (step S24).

To transmit a message to a subscriber who was one of the first participants in the multiple connections, the connection completion display in the connection information storage area in FIG. 2 is referred to. When the connection of the subscriber is being performed, the switching device halts the transmission of messages to that subscriber until the connection is completed.

As is described in the embodiments and examples, the connection completion display stored in the connection information storage area 41 in the memory 4 in FIG. 2 is referred to in order to transmit a message to a subscriber who was one of the first participants in the multiple connections. When the connection of the subscriber is being performed, the signal transmitter and receiver 2 in the switching device halts the transmission of messages to that subscriber until the connection is completed. As a result, the transmission of an invalid message from the switching device to the subscriber can be prevented.

As is described above in detail, according to the present invention, bidirectional connections can be easily set up, and can be added or deleted among a plurality of users who are connected to the same switching device. Further, if necessary, a mixing unit can be employed by the switching unit or by the user for the upstream connection.

Consequently, the requirements for establishing bidirectional connections and multiple connections for ATM switching are satisfied, and a bidirectional multiple connections can be implemented.

The above explained embodiments are used only to explain the present invention, and therefore, the present invention is not restricted to such the embodiments. The protection scope of the present invention is determined by the attached claims, and the equivalent to the description of the claims is within the scope of the present invention.

What is claimed is:

1. A method for forming multiple bidirectional connections for use in an asynchronous transfer mode switching device, comprising the steps of:

recognizing a connection request message sent from one calling subscriber, including information concerning other n–1 called subscribers, in said asynchronous transfer mode switching device;

transmitting the connection request message at once or sequentially to said n–1 called subscribers from the asynchronous transfer mode switching device;

transmitting a response to the calling subscriber from the asynchronous transfer mode switching device when the asynchronous transfer mode switching device receives the response sent back from one of the n–1 called subscribers;

establishing bidirectional connections between the calling subscriber and the one of the n–1 called subscribers;

converting the response into a reception message;

transmitting the reception message to all others of the called subscribers; and establishing bidirectional connections among the n–1 called subscribers, excepting for the calling subscriber.

2. The method according to claim 1, further comprising the steps of:

in said asynchronous transfer mode switching device, defining a single downstream connection from said calling subscriber and a single downstream connection from one of said n–1 called subscribers;

copying a cell on each of said downstream connection; and transmitting said copy to all of said n–1 called subscribers.

3. A method for forming multiple bidirectional connections for use in an asynchronous transfer mode switching device, comprising the steps of:

in said asynchronous transfer mode switching device, recognizing connection request message, from one calling subscriber, including information concerning other n–1 called subscribers, transmitting said connection request message including information concerning said calling subscriber and remaining subscribers at once or sequentially to said other n–1 called subscribers, responsive to said connections request message, from said asynchronous transfer mode switching device;

transmitting responses to said connection request message including information concerning said calling subscriber and said remaining subscribers, and transmitting connection request messages to other subscribers, by using information from each of said other n–1 called subscribers;

in said asynchronous transfer mode switching device, recognizing said connection request message sent to said other subscribers, and transmitting messages to said other subscribers;

setting a connection to said called subscriber when said asynchronous transfer mode switching device recognizes response messages from said other subscribers;

in said transfer mode switching device, defining only one downstream connection from said calling subscriber, copying cells on said connection, and transmitting a result to said other n–1 called subscribers, and setting bidirectional connections to said other n–1 called subscribers, other than said calling subscriber, when said response message relative to said connection request message form said calling subscriber.

4. A method for forming multiple bidirectional connections for use in an asynchronous transfer mode switching device comprising the steps of:

in said asynchronous transfer mode switching device, recognizing a connection request message, from one calling subscriber, including information concerning n–1 other called subscribers, and upon receipt of said connection request message, transmitting received messages at once or sequentially to said n–1 called subscribers; returning a response message and also transmitting to said switching device a request message for connections between a pertinent subscriber and all the remaining subscribers form each of said n–1 subscribers who have received said received messages; and in said asynchronous transfer mode switching device, receiving said request message for connection between said subscribers and transmitting a reception message to said subscribers who are to be interconnected with said pertinent subscriber, transmitting a response message to said pertinent subscriber when said asynchronous transfer mode switching device recognizes responses relative to said message received by said subscribers, and defining only one downstream connection from said subscribers, copying cells on said downstream connection, and transmitting a result said n−1 subscribers to establish bidirectional connections with said n−1 subscribers other than said calling subscriber.

5. The method according to claim 1,
wherein said connection request message from said calling subscriber includes information by which said calling subscriber may select whether to have mixing performed by said asynchronous transfer mode switching device to form one connection or n−1 connections from said asynchronous transfer mode switching device to said calling subscriber.

6. The method according to claim 5,
wherein information data for called subscribers is held in said switching device, and said information data includes information by which said called subscribers may select whether to have mixing performed by said asynchronous transfer mode switching device to form one connection or n−1 connections from said asynchronous transfer mode switching device to said called subscribers.

7. The method according to claim 1,
wherein response information or connection request messages, which said n−1 called subscribers transmit relative to said connection request messages, include information by which said called subscribers may select whether to have mixing performed by said asynchronous transfer mode switching device to form one connection from said asynchronous transfer mode switching device to said calling subscriber or to form n−1 connections.

8. The method according to claim 7,
wherein information for said called subscribers is held by said asynchronous transfer mode switching device, and said information includes information by which said called subscribers may select whether to have mixing performed by said asynchronous transfer mode switching device to form one connection from said switching device to said calling subscriber or to form n−1 connections.

9. The method according to claim 5,
wherein a plurality of mixing methods that are prepared by said asynchronous transfer mode switching device are selected in accordance with a subscriber message or data contained in subscriber information, or in accordance with a combination of said subscriber message and data contained in said subscriber information.

10. The method according to claim 1,
wherein said response message from each of said called subscribers includes band information concerning a connection and traffic level information, and a connection from one of said called subscribers to said n−1 subscribers is established under conditions different from those for a connection from said calling subscriber.

11. The method according to claim 1,
wherein when said switching device, before a message received from a specific called subscriber is to be transmitted, has not yet received a response relative to said reception request from said calling subscriber, said asynchronous transfer mode switching device verifies communication is enabled with said specific called subscriber, and said switching device waits for transmission of said received message by said specific called subscriber until said response from said specific called subscriber is received.

12. The method according to claim 1,
wherein said switching device generates data while correlating a list of subscribers forming n multiplex bidirectional connections, with connections conditions for said subscribers and call identification information and message identification information that are employed to establish connections between said subscribers and holds said data.

13. The method according to claim 1,
wherein when one of said n subscribers who constitute a bidirectional connection is to add one or more new subscribers, said subscriber transmits to said asynchronous transfer mode switching device a subscriber addition request, including information concerning said new subscriber, and said asynchronous transfer mode switching device provides information required for a subsequent connection.

14. The method according to claim 1,
wherein when a specific subscriber of said n subscribers forming a bidirectional connection is to disconnect another subscriber, said specific subscriber transmits, to said asynchronous transfer mode switching device, a disconnection request message, including information concerning said subscriber to be disconnected; whereby said asynchronous transfer mode switching device transmits, to said subscriber who is to be disconnected, a disconnection request message together with call identification information reciting only a termination of communication, and transmits a disconnection request message reciting a connection and a deletion relative to said subscriber to be disconnected; and upon receipt of a completion message relative to said disconnection request message, said asynchronous transfer mode switching device cuts off said connection and transmits said completion message to said specific subscriber who has requested said disconnection.

15. The method according to claim 1,
wherein when a specific subscriber of said n subscribers who constitute a bidirectional connection desires to disconnect another subscriber, said specific subscriber transmits, to said asynchronous transfer mode switching device, a disconnection request message, including information concerning said subscriber who is to be disconnected; said asynchronous transfer mode switching device transmits, to said subscriber who is to be disconnected, a disconnection request message, together with call identification information reciting only a termination of communication, and transmits a completion message to said specific subscriber who has requested said disconnection; said subscriber who is to be disconnected transmits a disconnection request message that recites a deletion of information that concerns said subscriber who is to be disconnected and disconnection of said subscriber who is to be disconnected; upon receipt of said message from said subscriber who is to be disconnected, said asynchronous transfer mode switching device transmits a disconnection request message, which recites a deletion of information concerning said subscriber who is to be disconnected and disconnection of said subscriber who is to be disconnected, to all associated subscribers that are recognized by said asynchronous transfer mode switching device; and upon receipt of responses, said data concerning said subscriber who is to be disconnected that are stored by said asynchronous transfer mode switching device are deleted and said subscriber is disconnected.

16. The method according to claim 1, wherein when a specific subscriber of said n subscribers forming a bidirectional connection desires to disconnect another subscriber, said specific subscriber transmits, to said asynchronous transfer mode switching device, a disconnection request message, including information concerning said subscriber who is to be disconnected; said asynchronous transfer mode switching device transmits, to said subscriber who is to be disconnected, a disconnection request message, together with call identification information, reciting only a termination of communication, and transmits a completion message to said specific subscriber who has requested said disconnection; said subscriber who is to be disconnected transmits, together with information concerning subscribers to whom connected, a disconnection request message that recites a deletion of data that concerns said subscriber who is to be disconnected and disconnection of said subscriber who is to be disconnected; and when said asynchronous transfer mode switching device has received said message from said subscriber who is to be disconnected, said asynchronous transfer mode switching device transmits, to all subscribers that are named in said disconnection request message, a disconnection request message that recites a deletion of information concerning said subscriber who is to be disconnected and disconnection of said subscriber who is to be disconnected; and upon receipt of responses, said data concerning said subscriber who is to be disconnected that are stored by said asynchronous transfer mode switching device are deleted and said subscriber is disconnected.

17. The method according to claim 1, wherein when a specific subscriber of said n subscribers forming a bidirectional connection desires to be disconnected from said bidirectional connection, said specific subscriber transmits, to said asynchronous transfer mode switching device, a disconnection request message for disconnection of said specific subscriber; said asynchronous transfer mode switching device transmits a completion message to said specific subscriber, and also transmits to said other n−1 subscribers disconnection request messages reciting deletion of data concerning said specific subscriber and disconnection of said specific subscriber; and upon receipt of disconnection completion messages from said n−1 subscribers, said data concerning said specific subscriber that are stored by said asynchronous transfer mode switching device are deleted and said specific subscriber is disconnected.

18. The method according to claim 1, further comprising the steps of:

in one of n subscribers forming said bidirectional connection, employing procedures that are determined in advance for mixing change to obtain a mixing that a specific subscriber has designated in a mixing change request message and changing the mixing for the specific subscriber in a bidirectional connection.

19. The method according to claim 1, further comprising the steps of:

when one of n subscribers who constitute a bidirectional connection is to terminate said bidirectional connection, transmitting a call disconnection request message to the asynchronous mode switching device from said subscriber; transmitting a completion message to said one subscriber and disconnection request message to n−1 subscribers; and, upon receipt of response messages relative to said disconnection request messages, disconnecting said call.

* * * * *